(12) United States Patent
Smith

(10) Patent No.: US 6,988,467 B1
(45) Date of Patent: Jan. 24, 2006

(54) SMALL ANIMAL BATHING APPARATUS

(76) Inventor: Candace Smith, 2716 Barton Creek, #1711, Austin, TX (US) 78735

(*) Notice: Subject to any disclaimer, the term of this patent is extended or adjusted under 35 U.S.C. 154(b) by 0 days.

(21) Appl. No.: 10/685,337

(22) Filed: Oct. 14, 2003

(51) Int. Cl.
*A01K 29/00* (2006.01)

(52) U.S. Cl. ..................................... 119/675; 119/673
(58) Field of Classification Search ............... 119/673, 119/675; D30/158; 4/539, 546
See application file for complete search history.

(56) References Cited

U.S. PATENT DOCUMENTS

| | | | |
|---|---|---|---|
| 4,316,433 A | | 2/1982 | Hebert |
| 4,930,453 A | | 6/1990 | Laliberte |
| 5,009,196 A | | 4/1991 | Young |
| D329,106 S | | 9/1992 | Benavides |
| 5,259,339 A | | 11/1993 | McLaughlin |
| D345,632 S | * | 3/1994 | McLaughlin ............... D30/158 |
| 5,373,814 A | | 12/1994 | Seymour |
| 5,662,069 A | * | 9/1997 | Smith ........................ 119/673 |
| 5,794,570 A | * | 8/1998 | Foster et al. ................ 119/673 |
| 5,845,604 A | * | 12/1998 | Cucchi et al. .............. 119/673 |
| 5,974,601 A | | 11/1999 | Drane et al. |
| 6,085,367 A | * | 7/2000 | Guiste .......................... 4/546 |
| 6,553,943 B1 | | 4/2003 | Murphy |
| 2004/0163609 A1 | * | 8/2004 | Jeffery ....................... 119/673 |

* cited by examiner

*Primary Examiner*—Michael J. Carone
*Assistant Examiner*—Elizabeth Shaw
(74) *Attorney, Agent, or Firm*—Garvey, Smith, Nehrbass & North, L.L.C.; Charles C. Garvey, Jr.

(57) ABSTRACT

A small animal bathing apparatus includes a portable enclosure having a floor, a front wall, a rear wall that is taller than the front wall and a pair of side walls, each wall having an upper edge. One or more drain openings is provided in the floor. One or more hangers are secured to the rear wall at an elevation above the upper edge of the front wall. One or more animal harnesses (each connected to a hanger) are provided that enable an animal that is to be bathed to be secured to the enclosure, preferably to the rear wall. The floor is preferably separable from the walls. The walls are collapsible one upon another for storage.

19 Claims, 3 Drawing Sheets

SMALL ANIMAL BATHING APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to devices for enabling a pet owner to bathe a quadruped animal that is a pet, such as a dog or a cat. More particularly, the present invention relates to an improved small animal bathing apparatus having a portable enclosure of improved configuration that includes a front wall, a rear wall that is significantly taller than the front wall, having side walls and a floor with drain openings in the floor. Harnesses are fixed to the rear wall at a position above the top of the front wall. The walls can be collapsible upon one another for storage.

2. General Background of the Invention

Millions of pet owners fight a battle when it is time to bathe the pet dog or cat. For some reason, small animal pets such as cats and dogs are not happy when they are thrust before a garden hose, tub, scrub brush and/or soap that necessarily must be employed to cleanse them of soil, dirt, grime or other foreign matter that the accumulate.

Many patents have issued that are directed generally to the problem of cleaning a pet such as a cat or a dog. Some of these devices are designed to be placed inside of a common tub so that when the pet is cleaned, the rinse water can flow from the pet through the drain holes into the tub and then down a drain. Such an example of a pet bathing device that can be used inside of a common tub can be seen in the Hebert U.S. Pat. No. 4,316,433 entitled "Animal Washing Stand." In the Hebert '433 patent, the animal bathing stand is adapted to be disposed within wash basins or the like to aid in the washing of an animal. The stand preferably comprises a generally planer, rigid central surface elevated from the bottom of the wash basin by foot structure which may be varied in length to fit individual application. A resilient pad is disposed over the supporting surface to provide secure footing for the animal to be washed. The pad preferably includes a peripheral skirt for adapting the stand for use in wash basins of varying dimensions. Perforations provided within the skirt aid in draining. Lease structure provided in the preferred form of a washing stand may be variably coupled between the supporting stand and the animal to facilitate the use of the invention with animals of different height.

The Benavides Des. 329,106 discloses a box for washing dogs.

A small animal washing container is shown in U.S. Pat. No. 5,974,601.

The Laliberte U.S. Pat. No. 4,930,453 discloses a small animal washing device that includes a dome enclosure. Apertures are provided in the dome to receive a pair of glove inserts in various locations for conveniently washing an animal within the dome.

A cat restrainer is discloses in U.S. Pat. No. 5,009,196. The '196 patent is directed to a restrainer harness apparatus designed primarily to function as a cat bather.

The McLaughlin U.S. Pat. No. 5,259,339 discloses a container for treating animals.

The Seymour U.S. Pat. No. 5,373,814 discloses an animal restraining device that could be used during bathing.

A pet bathing apparatus is shown in the Murphy U.S. Pat. No. 6,553,943.

The above referenced patents suffer in that they do not allow easy access to the animal during bathing notwithstanding the size of the animal while providing a portable and collapsible device that can be placed inside of a common tub and which drains continuously during bathing.

BRIEF SUMMARY OF THE INVENTION

The present invention provides a small animal bathing apparatus that includes an enclosure have a floor, a front wall, rear wall that is preferably taller than the front wall and a pair of side walls, each wall having an upper edge.

One or more drain openings is provided in the floor so that as the animal is bathed within the enclosure, water can drain through the floor to an underlying surface such as the inside of a tub.

One or more hangers are secured to the rear wall at an elevation that is preferably above the upper edge of the front wall. One or more animal harnesses are connected to a hanger that enables an animal that is to be bathed to be secured to the enclosure, preferably to the rear wall.

The floor can be separable from the walls. The walls are optionally collapsible upon one another for storage.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
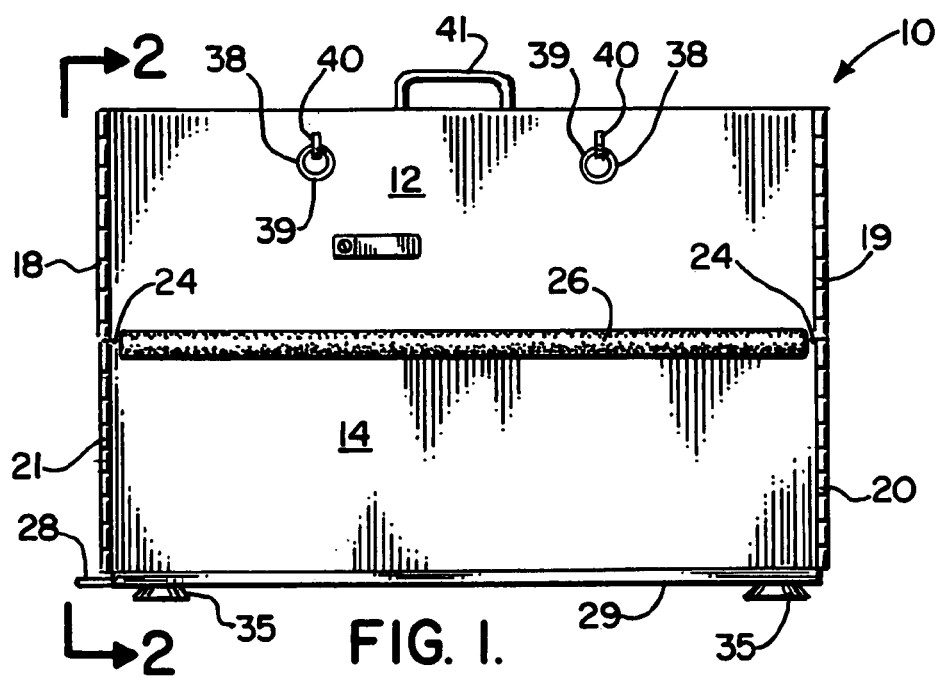
FIG. 1 is a front elevation view of the preferred embodiment of the apparatus of the present invention.
Figure 2:
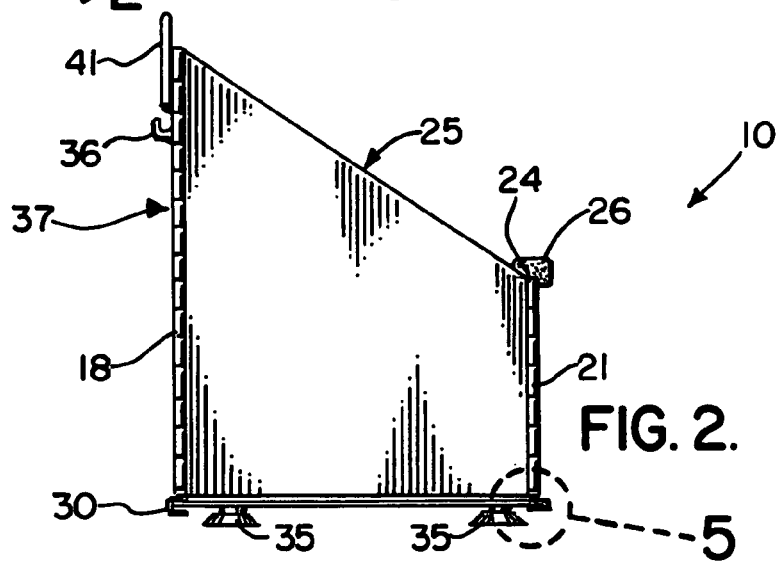
FIG. 2 is a side view of the preferred embodiment of the apparatus of the present invention, taken along lines 2—2 of FIG. 1.
Figure 3:
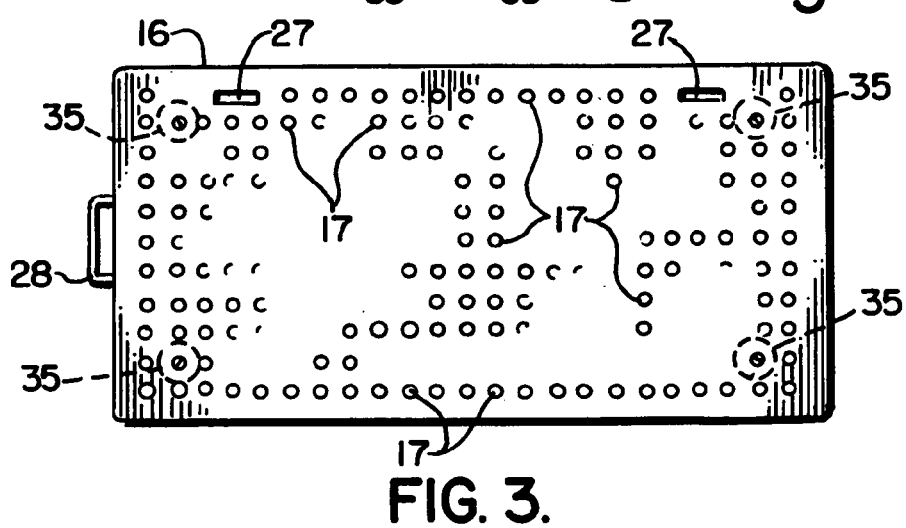
FIG. 3 is a partial plan view of the preferred embodiment of the apparatus of the present invention illustrating the removable floor portion.
Figure 4:
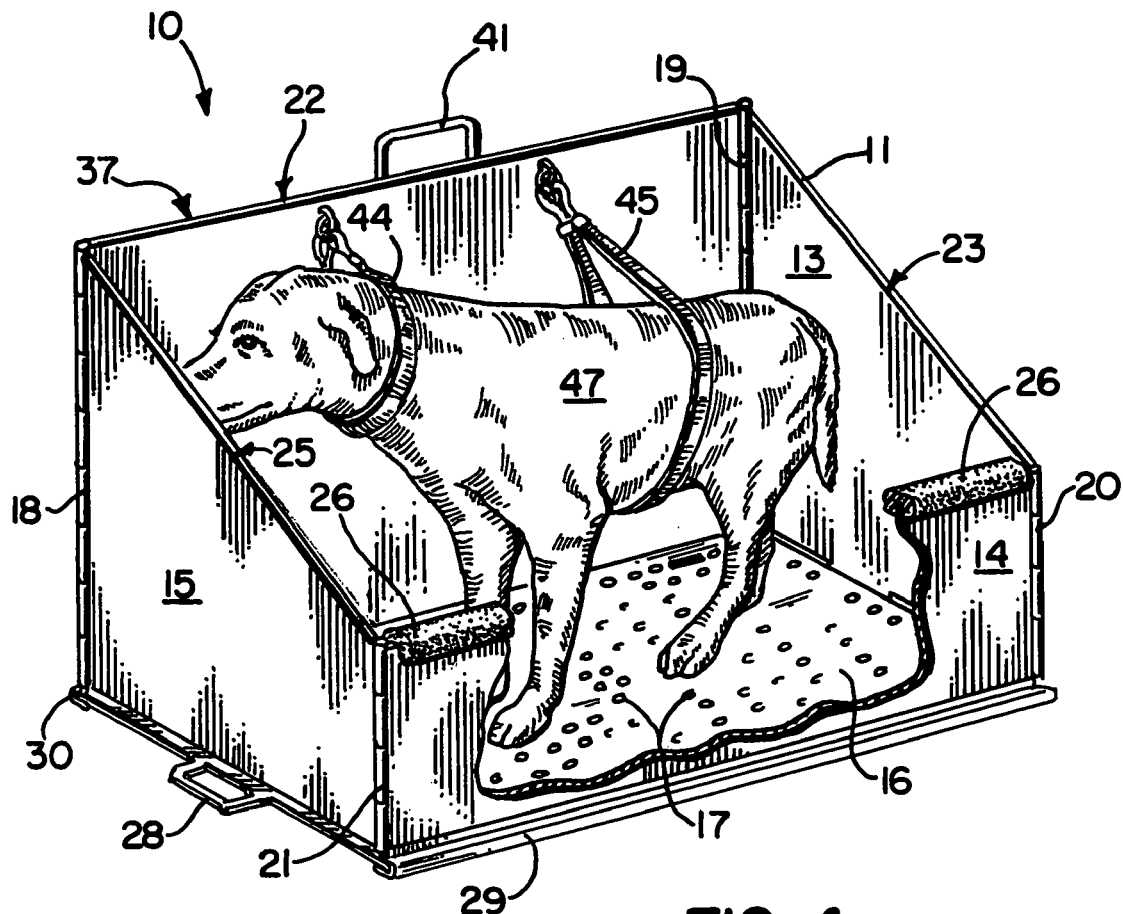
FIG. 4 is a cutaway perspective view of the preferred embodiment of the apparatus of the present invention.
Figure 6:
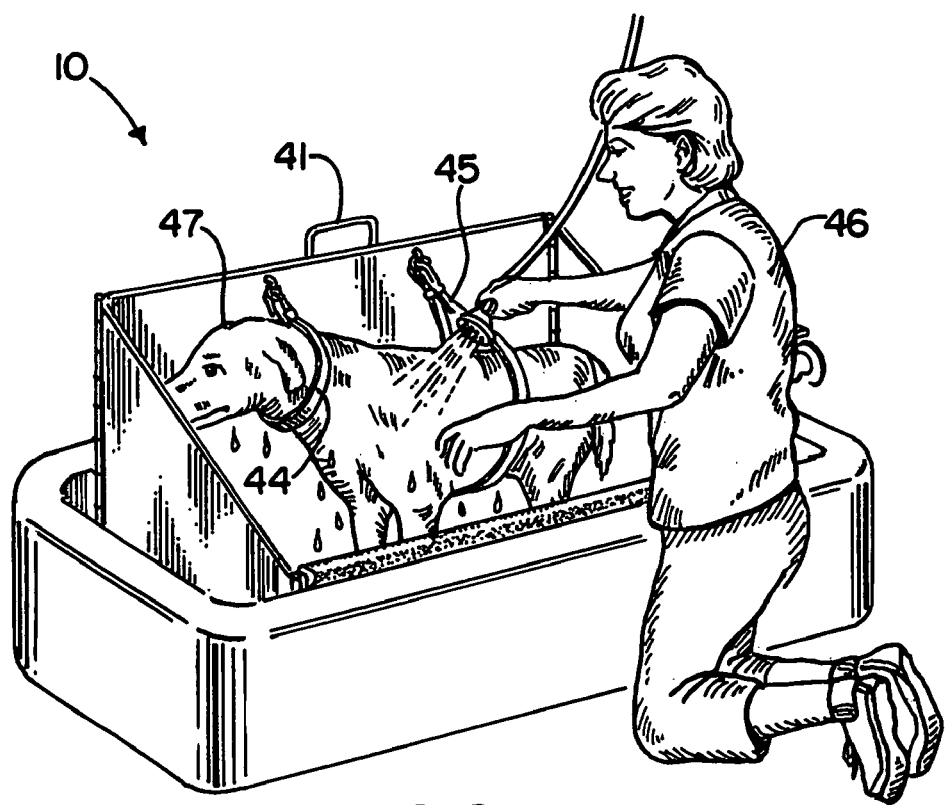
FIG. 6 is a perspective view of the preferred embodiment of the apparatus of the present invention.

Pet bathing apparatus 10 is shown generally in FIGS. 4 and 6. Pet bathing apparatus 10 includes an enclosure 11 that is comprised of rear wall 12, right side wall 13, front wall 14, left side wall 15 and floor 16.

Figure 7:
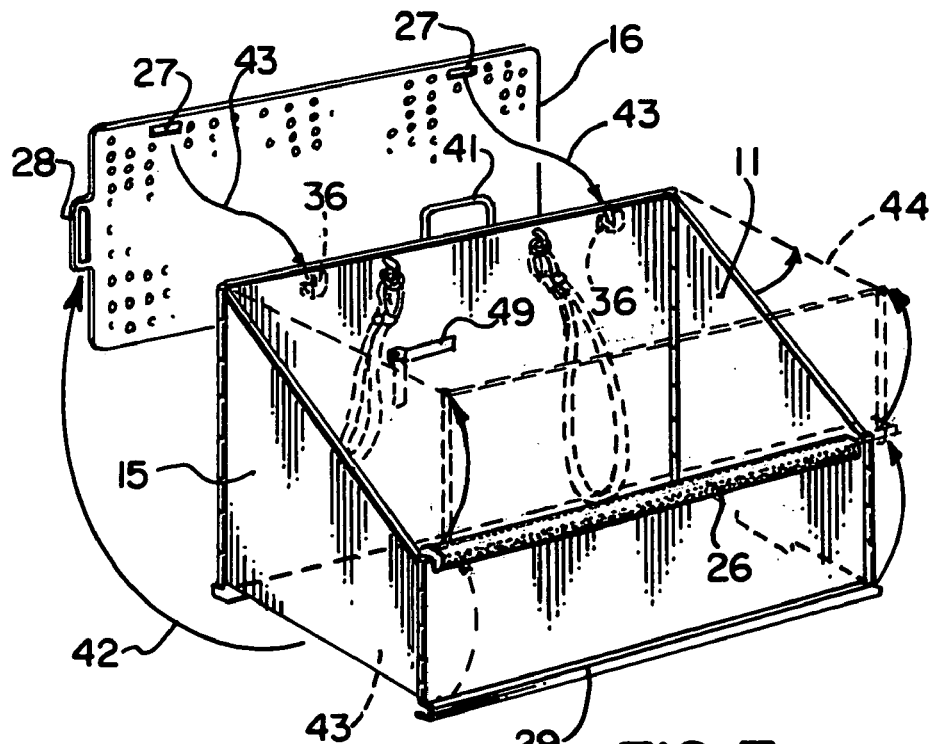
FIG. 7 is a perspective view of the preferred embodiment of the apparatus of the present invention illustrating the removal of the floor for collapsing the apparatus.

Floor 16 can be perforated, providing perforations 17. Hinges 18, 19, 20 and 21 can be provided for enabling the side walls, rear wall and front wall to fold upon each other (FIG. 7). After floor 16 has been removed. Hinge 18 forms a connection between rear wall 12 and side wall 15. Hinge 19 provides a hinged connection between rear wall 12 and side wall 13. Hinge 20 forms a hinged connection between side wall 13 and front wall 14. Hinge 21 forms a hinged connection between front wall 14 and side wall 15.

Rear wall 12 has an upper edge 22. Side wall 13 has an upper edge 23 that can be inclined. Front wall 14 has an upper edge 24 that can be covered with a cushion 26 such as a foam cushion. Side wall 15 has upper edge 25.

Figure 5:
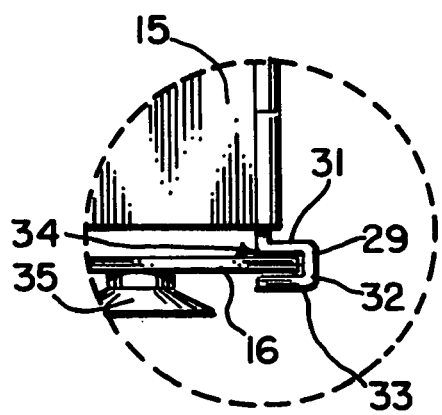
FIG. 5 is a fragmentary, detail view of the preferred embodiment of the apparatus of the present invention illustrating the floor connection.

Floor 16 has a pair of slots 27 that are spaced apart and next to one edge of floor 16 as shown in FIG. 7. Floor 16 also provides a handle 28 that enables a user 46 to remove the floor 16 when the apparatus 10 is to be collapsed for storage or transport. In that regard, a pair of tracks 29, 30 are provided for slidably engaging floor 16 with rear wall 12 and front wall 14. A front track 29 is provided at the bottom of front wall 14. A rear track 30 is provided at the bottom of rear wall 12 as shown in FIGS. 4 and 5. Each track 29, 30 can be comprised of a plurality of flanges, such as the flanges 31, 32, 33 shown in FIG. 5. These plurality of flanges 31, 32, 33 form a slot 34 that is receptive of an edge of floor 16. Floor 16 can provide a plurality of feet 35 that can be in the form of suction cups for enabling a good connection to be formed between floor 16 and an underlying tub surface.

When a user 46 wants to store the apparatus 10, he or she pulls on the handle 28 so that the floor 16 slides upon tracks 29, 30 until the floor 16 has been separated from the walls 12, 13, 14, 15 as indicated schematically by arrow 42 in FIG. 7. A pair of hooks 36 are provided on rear surface 37 of rear wall 12 enabling the floor 16 to be connected to the hooks 36 and remain there during storage or transport.

One of the features of the present invention is that the upper edge 24 of front wall 14 is significantly lower than the upper edge 22 of rear wall 12, enabling the user 46 to have complete access to the pet such as dog 47 that is to be washed. In order to retain the pet 47 within the interior 48 of enclosure 11 as shown in FIGS. 4 and 6, front and rear harnesses 44, 45 are provided. Each harness 44, 45 can be removably attached to a hanger 38 that can comprise, for example, a ring 39 and u-bolt 40 attached to rear wall 12 as shown in FIGS. 1, 4, 6 and 7. FIG. 6 shows that the user 46 can easily clean the animal 47 because the front wall 14 is much shorter than rear wall 12. In the preferred embodiment, the front wall 14 is about one quarter to one half the height of the rear wall 12.

Handle 41 enables a user 46 to carry the apparatus 10 once it has been placed in the folded position of FIG. 7 wherein front wall 14 remains parallel to but folds against rear wall 12 and wherein side walls 13 and 15 pivot in the direction of arrow 43. Pivoting arm 49 can then be pivoted as shown in phantom lines in FIG. 7 wherein the arm 49 retains side wall 15 in a folded position wherein it rests against rear wall 12.

PARTS LIST

The following is a list of suitable parts and materials for the various elements of the preferred embodiment of the present invention.

Parts Number Description
10 pet bathing apparatus
11 enclosure
12 rear wall
13 right side wall
14 front wall
15 left side wall
16 floor
17 perforation
18 hinge
19 hinge
20 hinge
21 hinge
22 upper edge
23 upper edge
24 upper edge
25 upper edge
26 cushion
27 slot
28 handle
29 front track
30 rear track
31 flange
32 flange
33 flange
34 slot
35 foot
36 hook
37 rear surface
38 hanger
39 ring
40 u-bolt
41 handle
42 arrow
43 arrow
44 front harness
45 rear harness
46 user
47 animal
48 interior
49 arm The foregoing embodiments are presented by way of example only; the scope of the present invention is to be limited only by the following claims.

What is claimed is:

1. A small animal bathing apparatus comprising:
   a) a portable enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each being connectable to a hanger, enabling an animal that is to be bathed to be secured to the rear wall;
   e) wherein the floor is separable from the walls; and
   f) wherein the walls are collapsible upon one another for storage.

2. The small animal bathing apparatus of claim 1 wherein one of the walls has a carrying handle.

3. The small animal bathing apparatus of claim 1 further comprising a hinge that joins one side wall to another side wall.

4. The small animal bathing apparatus of claim 1 wherein each wall is connected to another wall with a hinge.

5. The small animal bathing apparatus of claim 1 wherein one or more of the walls has a trapezoid shape.

6. The small animal bathing apparatus of claim 1 wherein each of the side walls are of a trapezoid shape.

7. The small animal bathing apparatus of claim 1 wherein the floor slidably connects to a pair of the walls.

8. The small animal bathing apparatus of claim 1 wherein two of the walls are generally opposed and each has a guide rail, the bottom removably connecting to the guide rails.

9. The small animal bathing apparatus of claim 1 wherein one sidewall and the front wall are collapsible upon the rear wall and a side wall.

10. A small animal bathing apparatus comprising:
   a) a portable enclosure having a floor, a front wall, a rear wall that is taller than the front wall and a pair of side walls, each wall having an upper edge and wherein multiple of the walls fold upon one another so that the enclosure can be folded for storage;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall; and
   e) wherein the front wall has a height that is about one half or less the height of the rear wall.

11. The small animal bathing apparatus of claim 10 wherein one of the walls has a carrying handle.

12. A small animal bathing apparatus comprising:
   a) a portable enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall;
   e) wherein the front wall has a height that is about one half or less the height of the rear wall; and
   f) further comprising a hinge that joins one side wall to another side wall.

13. A small animal bathing apparatus comprising:
   a) a portable enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall;
   e) wherein the front wall has a height that is about one half or less the height of the rear wall; and
   f) wherein each wall is connected to another wall with a hinge.

14. The small animal bathing apparatus of claim 10 wherein one or more of the walls has a trapezoid shape.

15. The small animal bathing apparatus of claim 10 wherein each of the side walls are of a trapezoid shape.

16. A small animal bathing apparatus comprising:
   a) a portable enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall;
   e) wherein the front wall has a height that is about one half or less the height of the rear wall; and
   f) wherein the floor slidably connects to a pair of the walls.

17. A small animal bathing apparatus comprising:
   a) a portable enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall;
   e) wherein the front wall has a height that is about one half or less the height of the rear wall; and
   f) wherein two of the walls are generally opposed and each has a guide rail, the bottom removably connecting to the guide rails.

18. A small animal bathing apparatus comprising:
   a) portable enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall;
   e) wherein the front wall has a height that is about one half or less the height of the rear wall; and
   f) wherein one sidewall and the front wall are collapsible upon the rear wall and a side wall.

19. A small animal bathing apparatus comprising:
   a) a portable collapsible enclosure having a floor, a front wall, a rear wall that is taller than the front wall and a pair of side walls, each wall having an upper edge;
   b) one or more drain opening in the floor;
   c) one or more hanger that are secured to the rear wall at an elevation above the upper edge of the front wall;
   d) one or more animal harnesses, each connected to a hanger that enable an animal that is to be bathed to be secured to the rear wall;
   e) wherein the animal to be bathed has a height, and the front wall has a height that is smaller than the height of the animal to be bathed; and
   f) wherein walls of the enclosure fold upon one another enabling the enclosure to collapse and fold for storage.

* * * * *